Figure 1:
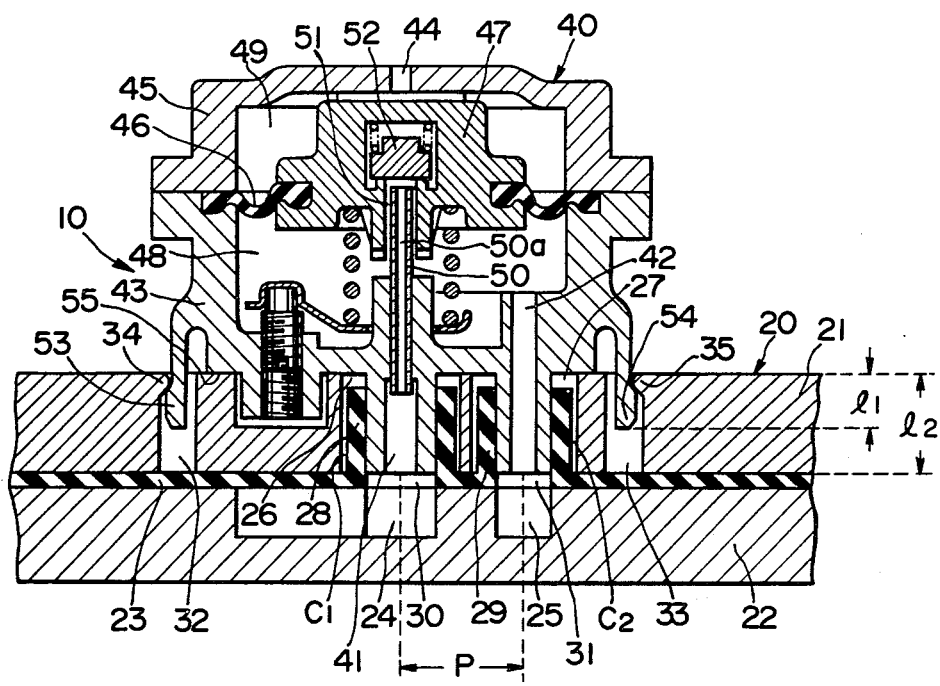

United States Patent [19]

Inada et al.

[11] 4,298,020
[45] Nov. 3, 1981

[54] INTEGRATED VALVE DEVICE

[75] Inventors: Masami Inada, Kariya; Kazuhiko Kitamura, Toyota; Shoji Ito, Nagoya; Takao Nonoyama; Riichi Tsuji, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 60,037

[22] Filed: Jul. 24, 1979

[30] Foreign Application Priority Data

Jul. 25, 1978 [JP] Japan .................. 53-102038[U]

[51] Int. Cl.³ .................... F16K 51/00; F16K 31/12
[52] U.S. Cl. .................... 137/315; 251/367; 137/494
[58] Field of Search .............. 251/367, 291, 143, 152; 137/315, DIG. 8, 494; 123/407, 570; 220/306, 307

[56] References Cited

U.S. PATENT DOCUMENTS

| | | | |
|---|---|---|---|
| 2,758,447 | 8/1956 | Prosek | 62/234 |
| 3,057,370 | 11/1962 | Hamilton | 137/315 |
| 3,086,544 | 4/1963 | Yost | 251/367 |
| 3,117,587 | 1/1964 | Willinger | 137/315 |
| 3,289,700 | 12/1966 | Gildone | 137/315 |
| 3,443,580 | 5/1969 | Kreuter | 137/510 |
| 3,503,586 | 3/1970 | Bordes | 137/315 |
| 3,766,943 | 10/1973 | Murata | 137/608 |

Primary Examiner—Martin P. Schwadron
Assistant Examiner—A. Michael Chambers
Attorney, Agent, or Firm—Finnegan, Henderson, Farabow, Garrett & Dunner

[57] ABSTRACT

An integrated valve device includes a base board means and control valve means mounted thereon for an exhaust gas purifying system. The control valve means is provided at its outer surface with a pair of fingers adapted to be inserted into openings on the base board means. The fingers engage therefore with shoulders of the openings when mounted on the base board means.

2 Claims, 2 Drawing Figures

INTEGRATED VALVE DEVICE

The present invention relates to a valve device and more particularly to an integrated valve device which is adapted to be used in automobile exhaust systems.

In recently built automobiles, the exhaust system is provided with various control components such as suction pressure responsive components, for example, suction pressure responsive control valves, suction pressure delay valves and suction pressure switching valves in order to constitute an exhaust gas purifying system. These components are usually disposed in various parts in the engine compartment so that complicated pipings are required to establish the exhaust gas purifying system. In order to simplify the pipings and provide a well arranged system, there has been proposed an integrated valve device in which the aforementioned control components are assembled on a single base board.

In this type of valve device, each of the components has two or more ports which are connected with port openings formed in the base board and are shielded with a cover which is secured to the base board. Further, in order to firmly secure the control components to the board, springs are disposed between the cover and the components. When the inspection of the control components is required, it is not easy to remove the cover and the springs, and it is necessary to restrain the uninspected components by applying an external force thereon. Thus, the inspection is troublesome.

It is therefore an object of the present invention to provide an integrated valve device in which various control components are directly connected to a base board means to simplify assembly and inspection of the components.

According to the present invention, the above and other objects can be accomplished by an integrated valve device comprising base board means formed with at least one opening and fluid passage therein, and a control component adapted to be connected with the opening and having at least a pair of downwardly extending projections which are inserted into openings formed in the base board means to maintain each component in predetermined position. In the arrangement of the present invention, the projections have fingers, respectively, which are engageable with shoulders formed along the openings.

Figure 2:
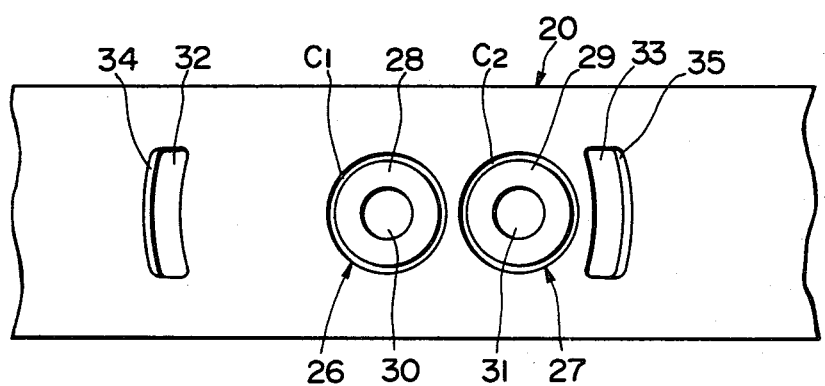

The above and other objects and features of the present invention will become apparent from the following descriptions of a preferred embodiment with reference to the accompanying drawings, in which;

FIG. 1 is a sectional view of a valve device in accordance with one embodiment of the present invention; and, FIG. 2 is a plan view of the base board in the valve device.

Referring to FIG. 1, there is shown a valve device 10 including a base board means 20 composed of a first plate 21 and a second plate 22 which are superimposed on each other with a resilient sealing gasket 23 interposed therebetween. The second plate 22 of the base board means 20 if formed with channels 24 and 25 and the first plate 21 is formed with openings 26 and 27 which are communicating with the channels 24 and 25, respectively. The channel 24 may be connected with a source of suction pressure (not shown) and the channel 25 with a control part (not shown).

The resilient sealing gasket 23 is integrally formed with tubular projections 28 and 29 which are disposed in the openings 26 and 27, respectively, with radial gaps $C_1$ and $C_2$ with respect to the peripheral walls of the openings 26 and 27. Thus, the projections 28 and 29 are movable in the radial directions. The projections 28 and 29 are respectively formed with axial through holes 30 and 31.

The base board means 20 is adapted for mounting suction pressure responsive components such as suction pressure control valves, suction pressure delay valves, suction pressure switching valves and pressure switches which constitute an exhaust gas purifying system. In the illustrated embodiment, a control valve 40 is mounted on the base board means 20. The control valve 40 comprises a first body 43 provided with a tubular inlet port 41 and a tubular outlet port 42, and a second body 45 having an air vent port 44. The first and second bodies 43 and 45 are assembled together with a diaphragm 46 disposed therebetween.

The diaphragm 46 has a diaphragm piston 47 and divides the inside of the bodies into a diaphragm chamber 48 and an atmospheric chamber 49. The diaphragm chamber 48 is always in communication with the outlet port 42 and the atmospheric chamber 49 with the vent port 44. The first body 44 is formed at the inlet port 41 with a pipe 50 which has a passage 50a therein and is inserted into the diaphragm piston 47 with a clearance 51. A valve member 52 is provided in the diaphragm piston 47 so as to close the passage 50a when the diaphragm 46 is deflected under a suction pressure which is transmitted into the chamber 48 through the inlet port 41, the passage 50a in the pipe 50 and the clearance 51 between the pipe 50 and the piston 47. The valve thus functions to provide a substantially constant suction pressure in the outlet port 42.

The inlet port 41 and the outlet port 42 of the suction pressure control valve 40 are gas-tightly fitted respectively to the axial holes 30 and 31 in the sealing gasket 23. Since the projections 28 and 29 are movable in the openings 26 and 27, respectively, in the radial directions, a reliable seal can be ensured at the ports 41 and 42 even if there is a change in the center distance between the inlet and outlet ports 41 and 42 due to a manufacturing error.

The first body 43 of the suction pressure responsive control valve 40 is provided at outer periphery with a pair of opposed fingers 53 and 54 which extend downwardly along the outer surface of the valve 40 in spaced relationship therewith and are radially flexible. On the first plate 21 of the base board means 20 openings 32 and 33 are bored. The openings 32 and 33 are formed with shoulders 34 and 35, respectively, which are engageable with the fingers 53 and 54 to be inverted into the openings 32 and 33. When the fingers 53 and 54 are inserted into the openings 32 and 33, a land 55 of the control valve seats against the upper surface of the first plate. The fingers 53 and 54 are first deformed radially inwardly and then steps of the fingers 53 and 54 are forced to engage on the shoulders 34 and 35 without using any specific parts. When the integrated valve device 10 is subjected to vibration, the land 55, the fingers 53 and 54 and the shoulders 34 and 35 serve to maintain the control valve 40 in a predetermined position.

Thus, the control valve 40 is mounted removably on the base board means 20 with simple work. Further, it is noted that little effort is required to remove the control valve 40 because the fingers 53 and 54 are readily deformed by the external force exerted thereon and pulled out from the openings 32 and 33. The distance $l_1$ between tip portions of each fingers 53 and 54 and the upper surface of the first body 43 is less than the longitudinal lengths ($l_2$) of the openings 32 and 33.

From the above descriptions, it will be understood that the objects of the present invention are accomplished. Although the invention has been described with reference to a specific embodiment, it should be noted that the invention is in no way limited to the details of the illustrated structures but changes and modifications may be made without departing from the scope of the appended claims.

We claim:

1. An integrated valve device for fluid control systems comprising base board means formed with at least two openings, and control valve means having at least two ports adapted to communicate with said openings respectively, said base board means having a plurality of channels formed therein, each of said channels being independent of one another for fluid communication with individual ones of said openings, said control valve means including a valve for controlling fluid communication between said channels through said openings, said control valve means being provided at the outer periphery thereof with at least a pair of resilient fingers, said fingers being deformable toward the radial direction thereof and being provided with stepped portions, said base board means having corresponding openings engageable with said fingers, and walls defining the corresponding openings, said walls being formed with shoulders radially spaced from said walls for contacting said stepped portions when said control valve means is mounted on said base board means and wherein said control means includes a flat land adapted to seat on the outer surface of said base board means, said flat level being disposed between one of said openings and said fingers when said control valve means is mounted on said base board means.

2. An integrated valve device in accordance with claim 1 wherein said resilient fingers extend downwardly in spaced relation to the outer periphery of the control valve means, said fingers being deformable radially inwardly.

* * * * *